Oct. 24, 1939.  F. H. ELLIOTT  2,177,209
HOLDER FOR GEAR-SHIFT LEVERS
Filed May 19, 1938  3 Sheets-Sheet 1
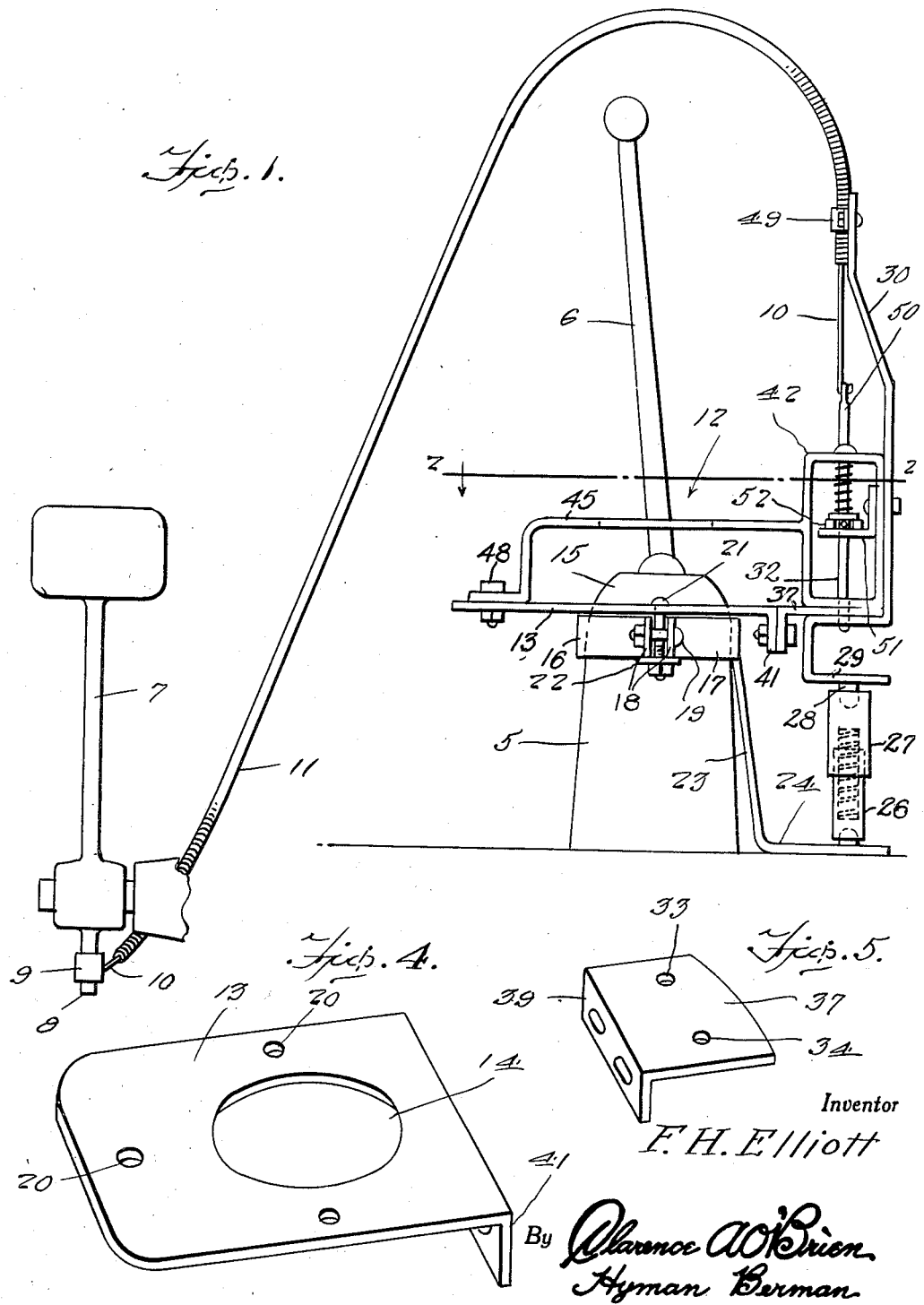
Inventor
F. H. Elliott
By Clarence A. O'Brien
Hyman Berman
Attorneys Oct. 24, 1939.                F. H. ELLIOTT                2,177,209
                         HOLDER FOR GEAR-SHIFT LEVERS
                           Filed May 19, 1938                3 Sheets-Sheet 2
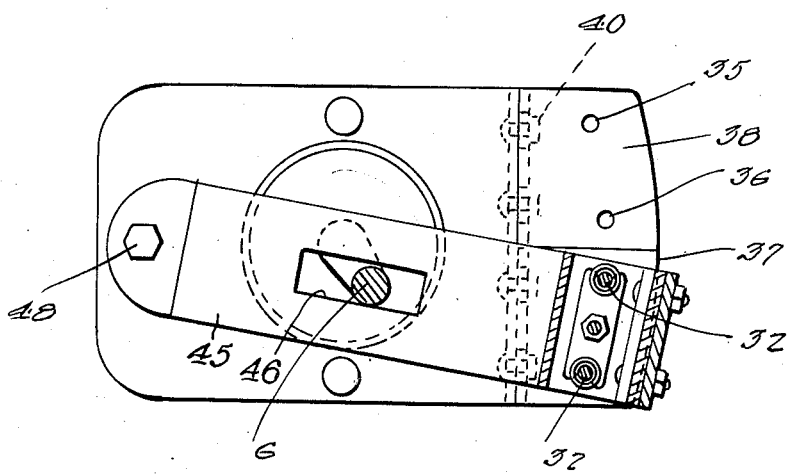
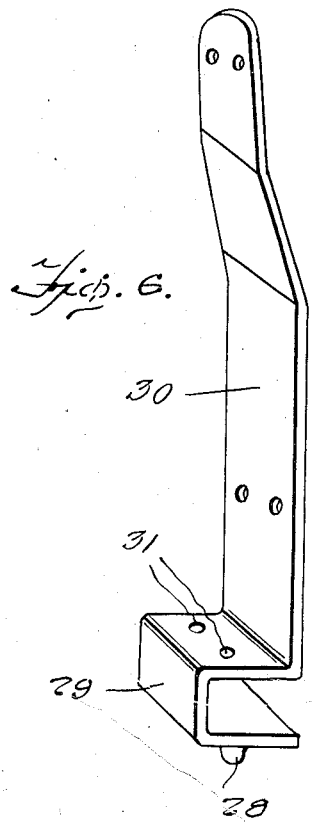
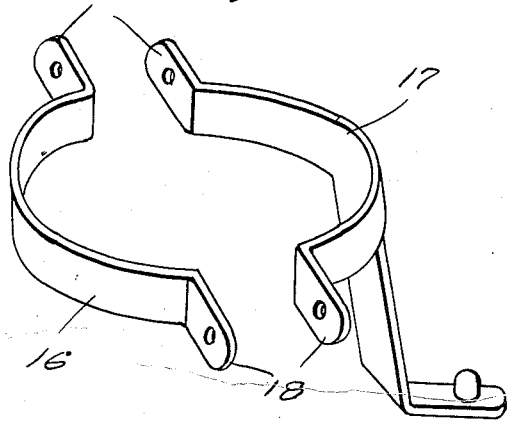
Inventor
F. H. Elliott
By Clarence A. O'Brien
Hyman Berman
Attorneys

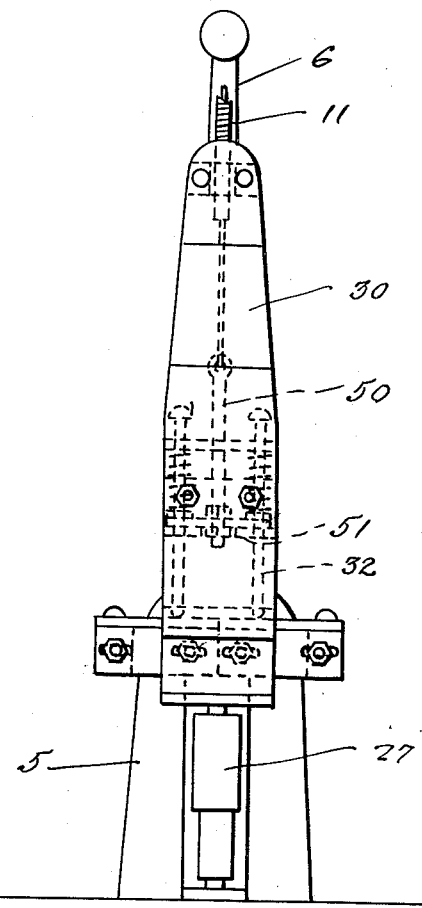
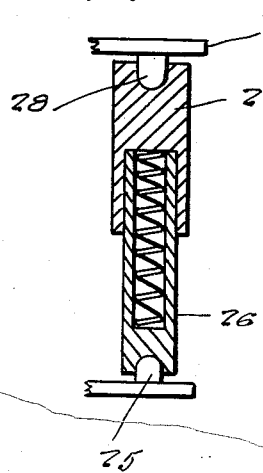
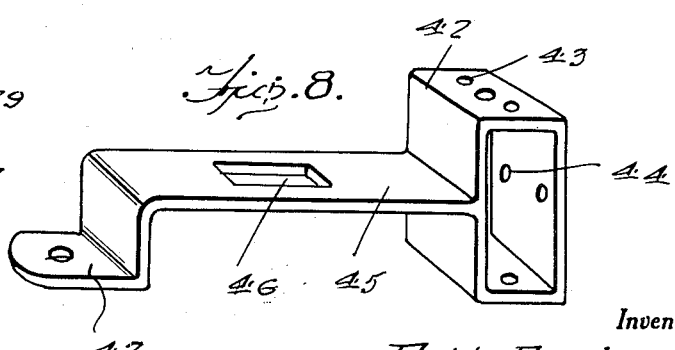

Patented Oct. 24, 1939

2,177,209

UNITED STATES PATENT OFFICE 2,177,209

HOLDER FOR GEAR-SHIFT LEVERS

Freeman H. Elliott, Hugo, Okla., assignor of one-fourth to Nicholas H. Ridgely, Springfield, Ill.

Application May 19, 1938, Serial No. 208,918

7 Claims. (Cl. 192—3.5)

This invention appertains to new and useful improvements in means for holding gear-shift levers to prevent transmission gears from jumping out of mesh when the transmission is placed under excessive strain, as sometimes happens with trucks and other heavy duty vehicles when pulling a heavy load up steep inclines.

The principal object of the present invention is to provide a holder for gear-shift levers which can automatically be released upon operation of the usual clutch pedal.

Another important object of the invention is to provide a holder of the character stated which will be positive acting, of simple construction and substantially fool-proof.

These and other important objects and advantages of the invention will become apparent to the reader of the following specification.

In the drawings:

Figure 1 represents a rear elevational view of the apparatus.

Figure 2 is a section on the line 2—2 of Figure 1.

Figure 3 is a side elevational view.

Figure 4 is a perspective view of the base plate.

Figure 5 is a perspective view of one of the keeper plates.

Figure 6 is a perspective view of the post.

Figure 7 is a perspective view of the clamp with the parts in exploded position.

Figure 8 is a perspective view of the controller.

Figure 9 is a fragmentary vertical sectional view of the resilient support.

Referring to the drawings wherein like numerals designate like parts, it can be seen that numeral 5 represents the usual stool in which the lower portion of the gear shift arm 6 is operative.

Numeral 7 denotes the usual clutch pedal to the lower portion 8 of which is clamped as at 9 the adjacent end of the flexible shaft 10 which extends through the flexible conduit 11 to the apparatus generally referred to by numeral 12 and which is associated with the gear shift lever 6.

The detent apparatus 12 consists of the substantially rectangular-shaped plate 13 having the circular opening 14 therein for engagement around the curved shoulder portion 15 of the stool 5. The clamp consists of a pair of semi-circular shaped members 16—17 having ears 18 at the ends thereof apertured to receive bolts 19 and as shown in Figure 1, the plate 13 has openings 20 therein through which bolts 21 are disposed, these bolts being disposed downwardly and through apertured plates or washers 22 which bear against the adjacent ears 18. Thus the base plate 13 is secured in place and to supplement this, the clamp section 17 is provided with the depending leg 23 which at its lower portion has the foot 24. This foot 24 has the boss 25 rising therefrom and engaging into the recess at the lower end of the barrel 26. The upper portion of this barrel is slidably disposed in the barrel 27 which at its upper end has a recess for receiving the boss 28 depending from the lower leg of the U-shaped formation 29 at the lower end of the post 30, this U-shaped portion 29 having in its upper leg a pair of openings 31 through which the lower ends of the pins 32—32 are engageable. These openings 31 register with certain of the openings 33, 34, 35 and 36 in the keeper plates 37 and 38, each of these keeper plates being provided with a slotted flange 39 bolted as at 40 to the end flange 41 of the base plate 13.

A cage 42 having openings 43 in the upper portion thereof and also openings in the lower portion thereof is intended to ride on the keeper plate 37 and one side wall of this cage 42 has openings 44 therein through which securing means can be disposed for securing the post 30 thereto.

An arm 45 extends laterally from the cage 42 and has the slot 46 therein for receiving the gear shift lever 6. The remaining end of the arm 45 is provided with the foot 47 swingably connected as at 48 to the base plate 13.

The conduit 11 is clamped as at 49 to the upper end of the post 30 while the flexible shaft or wire 10 extends downwardly and connects to the upper end of the pin 50 which extends downwardly through the central opening 43 and through the bracket 51. A cross member 52 carried by the pin 50 supports the pair of pins 32 also slidable through the bracket 51 and these pins are disposable through the bottom of the cage 42 and into the corresponding openings of the keeper plates 37—38 to hold the cage in arm 45 and in the position it is brought to automatically by the movement of the gear shift arm 6.

It can be seen that in operation, when it is desired to shift gears, the clutch pedal 7 is depressed, which action lifts the pins 32 so that the arm 45 is freed from the structure consisting of the plates 38 and 37 which are formed with the openings 33, 34, 35 and 36. With the pedal 7 depressed, the gear-shift lever 6 will move the plate 45 and to whatever position the plate 45 is moved by the gear shift lever 6, it will remain to hold the gear shift lever against accidental movement. This retention of course, takes place only after the clutch pedal is released so that the pins 32 will project into the corresponding openings of the plates 37 and 38.

It is intended that when the pins 32—32 are disposed into the openings 33 and 36, the gear-shift lever will be held in neutral position. When the gear-shift lever is moved to second gear position the openings 35 and 36 are occupied by the pins 32—32, and when the gear-shift lever is moved to reverse gear position one of the pins is disposed into the opening 35.

In moving the gear-shift lever to low gear position only one of the pins 32 engages into the opening 34, while when the gear shift lever is moved to high gear position, as shown in Figure 2, the openings 33 and 34 receive the pins 32—32.

While the foregoing specification sets forth the invention in specific terms, it is to be understood that numerous changes in the shape, size and materials may be resorted to without departing from the spirit and scope of the invention as claimed hereinafter.

Having described the invention, what is claimed as new is:

1. In combination with a clutch pedal, a gear-shift lever, a detent mechanism adapted to be actuated by the gear-shift lever, an operating connection between the clutch pedal and the detent mechanism for releasing the detent mechanism to permit the free movement of the gear-shift lever when the clutch lever is moved to clutch disengaging position, said detent mechanism including a swingable arm having a slot therein for receiving the gear-shift lever, a keeper and latch means carried by the swingable arm and adapted to cooperate with the keeper, said latch means being attached to the clutch pedal by means of the aforesaid connection.

2. In combination with a clutch pedal, a gear-shift lever, a detent mechanism adapted to be actuated by the gear-shift lever, an operating connection between the clutch pedal and the detent mechanism for releasing the detent mechanism to permit the free movement of the gear-shift lever when the clutch lever is moved to clutch disengaging position, said detent mechanism including a swingable arm having a slot therein for receiving the gear-shift lever, a keeper and latch means carried by the swingable arm and adapted to cooperate with the keeper, said latch means being attached to the clutch pedal by means of the aforesaid connection, said latch means including a pin, said keeper including a perforated plate for receiving the pin.

3. In combination with a clutch pedal, a gear-shift lever, a detent mechanism adapted to be actuated by the gear-shift lever, an operating connection between the clutch pedal and the detent mechanism for releasing the detent mechanism to permit the free movement of the gear-shift lever when the clutch lever is moved to clutch disengaging position, said detent mechanism including a swingable arm having a slot therein for receiving the gear-shift lever, a keeper and latch means carried by the swingable arm and adapted to cooperate with the keeper, said latch means being attached to the clutch pedal by means of the aforesaid connection, said keeper consisting of a plate having a plurality of openings therein, said latch means consisting of a pair of pins operated by the said connection and being adapted to project into the openings of the keeper plate.

4. In combination with a clutch pedal, a gear-shift lever, a detent mechanism adapted to be actuated by the gear shift lever, an operating connection between the clutch pedal and the detent mechanism for releasing the detent mechanism to permit the free movement of the gear-shift lever when the clutch lever is moved to clutch disengaging position, said detent mechanism including a swingable arm having a slot therein for receiving the gear-shift lever, a keeper and latch means carried by the swingable arm and adapted to cooperate with the keeper, said latch means being attached to the clutch pedal by means of the aforesaid connection, a flexible conduit for the said connection, an arm rising from the keeper and attaching means at the upper end of the arm for holding the adjacent end of the conduit.

5. In combination with a clutch pedal, a gear-shift lever, a detent mechanism adapted to be actuated by the gear-shift lever, an operating connection between the clutch pedal and the detent mechanism for releasing the detent mechanism to permit the free movement of the gear-shift lever when the clutch lever is moved to clutch disengaging position, said detent mechanism including a swingable arm having a slot therein for receiving the gear-shift lever, a keeper and latch means carried by the swingable arm and being cooperative with the keeper, said latch means being attached to the clutch pedal by means of the aforesaid connection, a base plate on which the swingable arm is mounted, said keeper being carried by the said base plate.

6. In combination with a clutch pedal, a gear-shift lever, a detent mechanism adapted to be actuated by the gear-shift lever, an operating connection between the clutch pedal and the detent mechanism for releasing the detent mechanism to permit the free movement of the gear-shift lever when the clutch lever is moved to clutch disengaging position, said detent mechanism including a swingable arm having a slot therein for receiving the gear-shift lever, a keeper and latch means carried by the swingable arm and being cooperative with the keeper, said latch means being attached to the clutch pedal by means of the aforesaid connection, a base plate on which the swingable arm is mounted, said keeper being carried by the said base plate, a gear-shift lever stool attaching clamp and connecting means between the base plate and the clamp.

7. In combination with a clutch pedal, a gear-shift lever, a detent mechanism adapted to be actuated by the gear-shift lever, an operating connection between the clutch pedal and the detent mechanism for releasing the detent mechanism to permit the free movement of the gear-shift lever when the clutch lever is moved to clutch disengaging position, said detent mechanism including a swingable arm having a slot therein for receiving the gear-shift lever, a keeper and latch means carried by the swingable arm and being cooperative with the keeper, said latch means being attached to the clutch pedal by means of the aforesaid connection, a base plate on which the swingable arm is mounted, said keeper being carried by the said base plate, a gear-shift lever stool attaching clamp and connecting means between the base plate and the clamp, a leg depending from the clamp and provided with a foot, and adjustable means between the foot and the keeper.

FREEMAN H. ELLIOTT.